Figure 1:
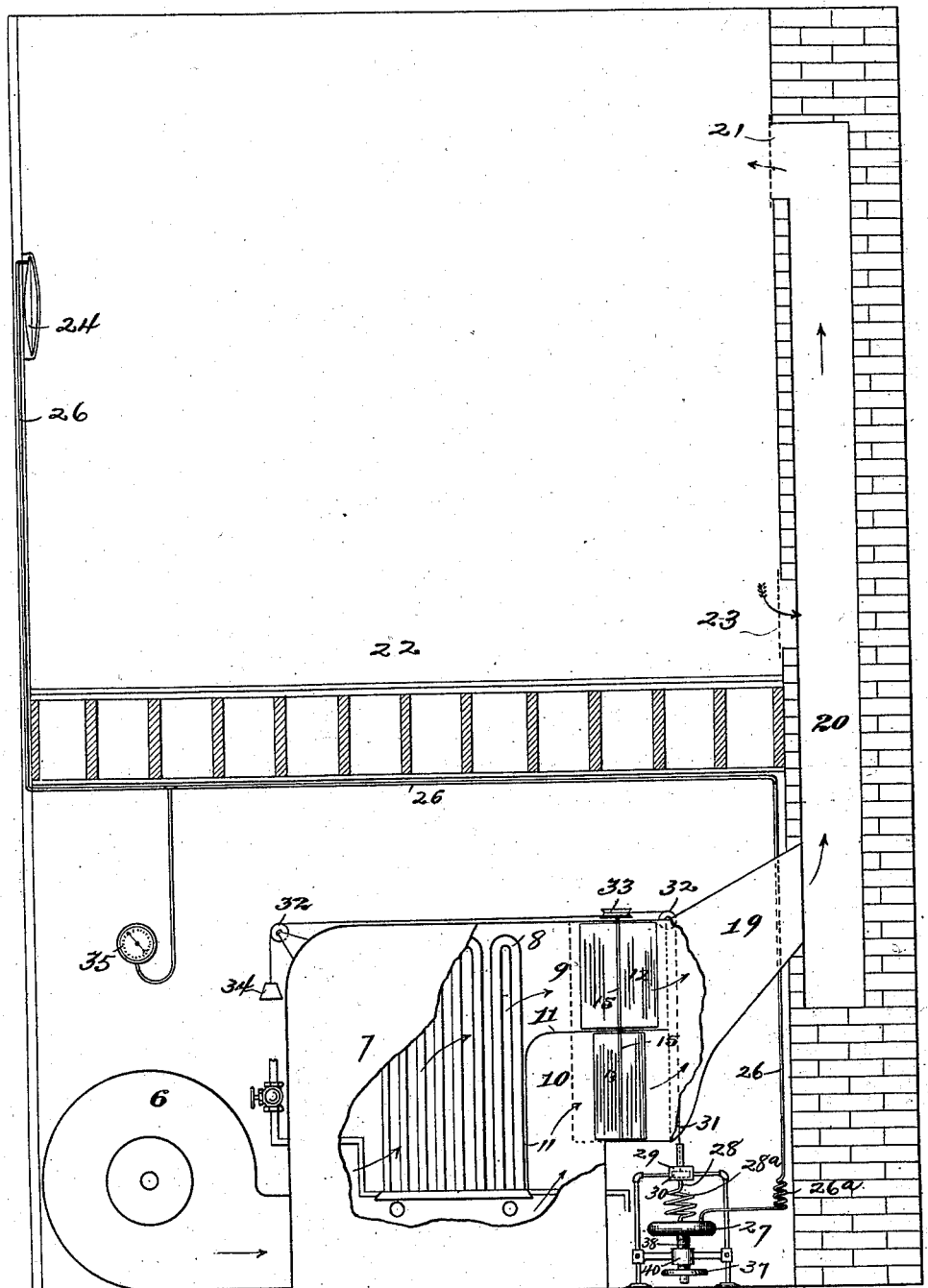

(No Model.)  3 Sheets—Sheet 1.
W. P. POWERS.
HEATING AND VENTILATING.
No. 558,610. Patented Apr. 21, 1896.

Witnesses,

Inventor, (No Model.)  3 Sheets—Sheet 2.
W. P. POWERS.
HEATING AND VENTILATING.
No. 558,610.  Patented Apr. 21, 1896.
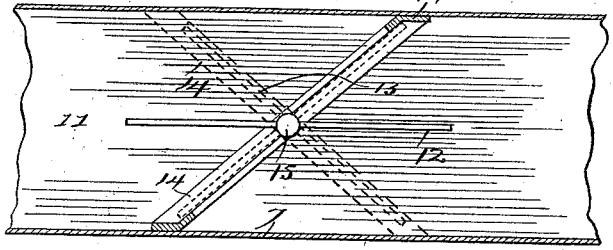
Fig. 4.
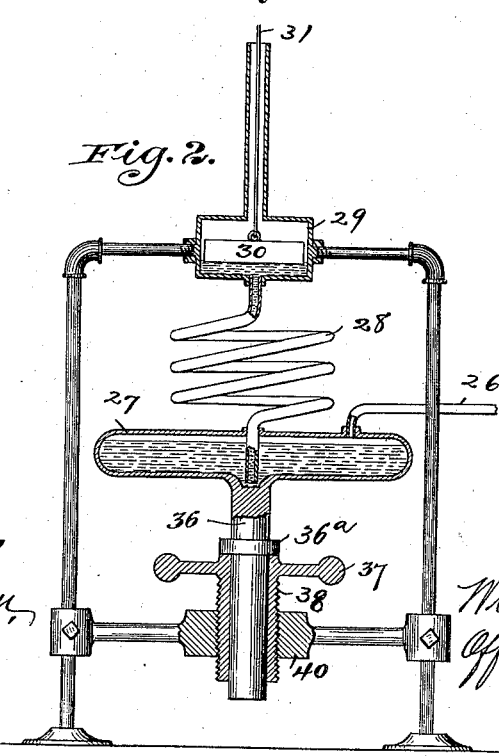
Fig. 3.
Fig. 2.
Witnesses,  Inventor,

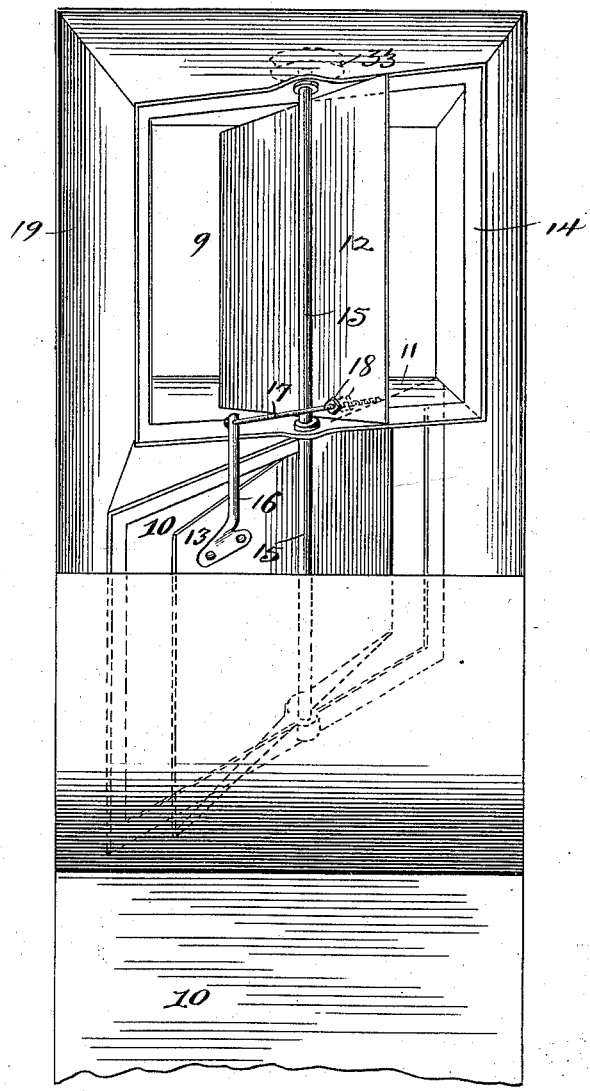

UNITED STATES PATENT OFFICE.

WILLIAM P. POWERS, OF CHICAGO, ILLINOIS.

HEATING AND VENTILATING.

SPECIFICATION forming part of Letters Patent No. 558,610, dated April 21, 1896.

Application filed March 26, 1895. Serial No. 543,208. (No model.)

*To all whom it may concern:*

Be it known that I, WILLIAM P. POWERS, of Chicago, Illinois, have invented certain new and useful Improvements in Heating and Ventilating, of which the following is a specification.

This invention relates to a heating and ventilating system for heating and ventilating apartments wherein the heating medium is warm air and the necessary amount of fresh air for ventilation is secured by mixing the appropriate quantity of air at normal temperature with the heated or warm air.

The invention relates more particularly to the automatic control of the respective volumes of hot and cool air, so as to secure at all times the delivery of a uniform quantity of air into the apartment or apartments to be heated and ventilated, while the proportions of the heated to the cool air are automatically regulated according to the temperature of the room itself.

In carrying out my invention I make use of a gradually-acting pressure-thermostat which controls through a suitable valve or damper the hot and cold air passages. When two dampers are used, they are interconnected, and the movement of one by the action of the thermostat effects the movement of the other, so that while the relative proportions of the two currents of air may be varied the aggregate quantity delivered remains the same.

My invention therefore consists, broadly, in a system of heating and ventilating by means of two currents of air at different temperatures automatically mixed, so as to maintain a uniform temperature in the apartment into which they are delivered, this delivery of the mixed air being made through a single pipe.

My invention further consists in certain devices and combinations of devices employed in the carrying out of this system, as hereinafter described, and more particularly pointed out in the claims.

In the accompanying drawings, Figure 1 is a sectional elevation showing two floors of a building, in the lower story of which the devices for forcing, heating, and mixing the air-currents are located, the section being taken through the air stack or shaft and showing in the upper story a thermostat affixed to the wall. Fig. 2 is an elevation, partly in section, through the pressure device for operating the valves or dampers. Fig. 3 is a sectional view of the thermostat. Fig. 4 is a longitudinal section through the upper air-passage, showing one of the dampers therein in full lines and the other below in dotted lines. Fig. 5 is a perspective view showing the ducts or passages containing the dampers, the dampers being shown partially open, the view being taken from the delivery end of the passages.

In the drawings, 6 represents a fan-blower, the eye of which will be in communication with the outer atmosphere, so as to draw through and discharge from the fan a current of air at atmospheric temperature. This air is delivered into a chamber the wall of which is marked 7, and the size of which will be proportioned to the space to be heated. Within this chamber is located some means for heating the air. In the present instance a radiator 8 is shown, through the coils or loops of which steam will be passed. The air is delivered under pressure into this chamber and the whole or a portion of it will be heated by passing over the heating coils or pipes, depending on whether the branches or ducts, respectively, are open or closed. Said branches or ducts are marked 9 10, and are separated by the partition 11, which divides the chamber into two elbow-shaped passages. The branch 10 of the passage-way extends beneath the heating-coils, so that the whole or a portion of the air-current delivered into the chamber may pass beneath the radiator and escape through the duct 10. Dampers 12 13 control these ducts, and said dampers are preferably mounted in metal frames 14, affixed to the walls of the ducts, respectively. The dampers are pivoted at their middles by the spindles 15, having bearings in the metal frames 14. The dampers are preferably mounted separately, and the two dampers are adjustably connected together by means of the rigid arm 16, secured to one of the dampers, and the rod 17, secured to the upper end of the arm and adjustably connected to the other damper by means of the jam-nuts 18. Instead of employing two dampers a single damper may be located at the entrance to the branches or ducts of the air-passage and thus adapted to control both.

It will be observed by reference to Figs. 4 and 5 of the drawings that the dampers 12 13 are set obliquely to the ducts and that the planes of the frames intersect each other at substantially right angles. The planes of these frames correspond to the planes of the dampers when the latter are closed, and obviously when one of the dampers is closed the other will be opened to its widest extent or in a line parallel with the duct. Obviously, also, any variation of one of the dampers from its closed position will effect a corresponding adjustment of the other damper.

The object of placing the dampers at an angle with reference to the line of the duct is to secure quicker action when either damper opens or closes and to secure the full action of said dampers with the shortest movement, such movement being one-eighth of a revolution when the damper-frame is placed at an angle of forty-five degrees to the longitudinal axis of the duct-line, while if the damper-frame were set at right angles to such axis, as in the common manner, a full quarter-turn would be required to secure the same opening. This feature is highly important where, as in my present improvements, it is desired to secure the full range of movement of the dampers with a slight action of the thermostat and pressure device controlled thereby. By means of my arrangement I secure the full action of the dampers with slight movements of the controlling devices, and I secure an immediate effect upon the inception of the movement of the controlling devices upon the opening damper. By this arrangement of the dampers also the effective area of the ducts is not diminished when the dampers are partially opened, as would be the case if the dampers were so set that when closed they would be at right angles to the axis of the ducts.

The ducts 9 and 10 deliver into the trunk 19, which discharges into the stack 20, having the outlet 21 into the apartment 22, and an outdraft is indicated at 23, connecting, of course, with a separate flue located at the side of stack 20. (Not shown in the drawings.)

The damper-controlling apparatus which I preferably employ comprises a thermostat in communication with a mercury-chamber, the latter being in communication with a second chamber containing a float, and the movements of the float being utilized to operate the dampers. The thermostat (shown at 24, Fig. 1, and in section in Fig. 3) has a flexible diaphragm 25, thus dividing the thermostat into two chambers, in one of which a fluid, expansible under the action of heat, is inclosed. The construction and operation of this thermostat is clearly shown and described in Patent No. 416,947, granted to me December 10, 1889. A pipe 26 is connected with the other chamber, and said pipe leads to a mercury-chamber 27. This pipe contains a fluid column, preferably air, and this column is utilized to transmit motion, as hereinafter described. A body of mercury is filled into said chamber, and the latter is in communication, through the pipe 28, with the float-chamber 29, in which is the float 30. A cord 31, connected with the float, is carried over sheaves 32 and around a sheave 33 on the projecting end of the spindle 15. A weight 34 is connected to the end of the cord beyond the sheaves. The float 30 is enough heavier than the weight 34 to hold the upper damper normally wide open. This insures the full heating capacity of the apparatus when the thermostat is cold, the lower damper being closed and all the air passing over the coils to the stack.

When the temperature in the apartment containing the thermostat approximates the degree at which the apparatus is set for operation, the thermostat acts by the vaporization of the liquid in the thermostat, whereby the diaphragm thereof is flexed, compressing the air-column sealed in the chamber, which passes through the connecting-pipe into the mercury-chamber above the body of mercury. The latter is displaced by this pressure and caused to rise through the pipe 28, gradually filling the chamber 29 and lifting the float 30, permitting the weight 34 to act upon the damper and spindle and moving the damper in the hot-air duct toward its closed position, correspondingly opening at the same time the damper in the cold-air duct, so as to admit cold air therethrough.

The particular thermostat above described will be found well adapted to the purposes of my invention, and the mercury-chamber is also a practicable device for operating the dampers; but it is obvious that modifications may be made in these elemental devices.

My invention embraces in operation a thermostatic device working in connection with a fluid column, the pressure of which is proportional to and is controlled by the thermostatic action. As herein shown, the air-column is compressed by the movement of the diaphragm of the thermostat; but a different form of thermostat may be used for maintaining a fluid pressure proportional to the temperature, and instead of the mercury device any other suitable fluid-pressure motor may be used for moving the dampers.

It will be observed that the volume of air delivered through the stack will be the same in all cases; but the proportion of hot to cold will vary as required by the conditions. In actual use, after the apartment is brought to the proper temperature, the dampers will seldom occupy their extreme positions, but will be partially open, varying their positions automatically and as required to maintain equable temperature in the apartment controlled by the thermostat.

The device may be regarded as a means for mixing hot and cold air in requisite proportions to maintain such equable temperature in contradistinction to those systems wherein the ducts are controlled by dampers in such manner that the hot and cold air will be delivered separately and alternately into the room, the mixture taking place in the room, and in which the dampers perform their whole range of movement when actuated.

In my system the mixing is effected in the trunk and stack, and the desired proportions of hot and cold air are commingled by the automatic action of the dampers, varying their range of movement between their extremes and in exact proportion each to the other and resulting in the delivery of a continuous volume of air into the room and maintaining therein a practically uniform temperature.

I am aware that the mixing of hot and cold air before the delivery to a room has been secured by manually-operated dampers; but this kind of regulation, while requiring constant attention, does not secure sufficiently uniform results. By my arrangement when the temperature of the room has reached the desired degree the dampers have assumed the proper position and there remain so long as the conditions remain the same.

The heating apparatus most commonly employed are radiators or steam-coils arranged in sections, the sections being separately controllable by valves, so that the amount of radiating-surface in use may be varied by the engineer by the manipulation of the valves. In order that the engineer may have means of knowing the temperature of the rooms to which he is to supply heat and thereby regulate the heating apparatus, I have connected with the thermostat 24 a gage 35, which is placed conveniently for the engineer and which is marked to indicate the degrees of temperature corresponding to the pressure of the air-column in the pipe connecting the thermostat with the mercury-chamber. A gage is used for each of the rooms heated and controlled. Thus the engineer may know the temperature of the rooms to which the heat is being delivered and he is thereby enabled to vary it within certain limits by changing the amount of effective radiating-surface to which the air to be delivered to any room is exposed.

As a means for setting the apparatus to operate at different temperatures I provide in the pipe 28 a series of coils $28^a$ and make the mercury-chamber 27 adjustable to and from the float-chamber 29—for example, by mounting the chamber 27 upon a stem 36, which may be threaded and moved up and down in its support by means of the hand-wheel 37, or, as in the preferred construction, (shown in Fig. 2,) where the stem 36 has a collar $36^a$ and a sleeve-nut 38, operating in a threaded collar or support 40, which tends to raise or lower the mercury-chamber. With this method of regulation the degree of temperature at which the device will operate has a certain relation to the height of the column which is dependent upon the distance of the mercury-chamber from the float-chamber, and this distance may be varied by the adjusting means before pointed out. In order to permit this, pipe 26 may have the coils $26^a$.

It is obvious that the construction and arrangement of parts herein shown and described may be varied as to details, and that my invention may be embodied in heating and ventilating systems widely varying as to such structural details from the form herein presented.

Without therefore limiting myself to the precise construction and arrangement shown, I claim—

1. In an air-heating and ventilating system, separate ducts for currents of air at different temperatures, in combination with means for controlling the flow of the air-currents and a gradually-acting thermostatically-governed motor for controlling said means and operating to vary the position of the controlling means according to changes of temperature, substantially as described.

2. In an air-heating and ventilating system, separate ducts for currents of air at different temperatures, in combination with means for forcing the air, means for heating the current of air passing through one of the ducts, means for controlling the flow of the air-currents, and a gradually-acting thermostatically-governed motor for controlling said means, the construction of said duct-controlling means being such as to close one of the ducts in proportion to the extent to which the other is opened, whereby the air is directed proportionally through each of said ducts according to the variations of temperature in the apartment to be controlled, substantially as described.

3. In an air-heating and ventilating system, separate ducts for currents of air at different temperatures in combination with valves or dampers for controlling the ducts, a pneumatically-operated pressure device for controlling the valves or dampers and operating against a gradually-increasing resistance and a thermostat for maintaining the air-pressure proportionally to the temperature of the apartment to be controlled, substantially as described.

4. In an air-heating and ventilating system, separate ducts for currents of air at different temperatures in combination with valves or dampers, one for each duct and set obliquely with reference to the duct, said dampers being connected to each other, and a gradually-acting thermostatically-controlled motor for controlling the dampers and operating to vary their position according to changes of temperature, substantially as described.

WILLIAM P. POWERS.

Witnesses:
FREDERICK C. GOODWIN,
C. C. LINTHICUM.